United States Patent [19]
Stark et al.

[11] Patent Number: 6,075,099
[45] Date of Patent: Jun. 13, 2000

[54] EPOXIDIZED POLYESTER-BASED POWDER COATING COMPOSITIONS

[75] Inventors: Charles John Stark; Edward John Marx, both of Houston, Tex.

[73] Assignee: Shell Oil Company, Houston, Tex.

[21] Appl. No.: 08/596,059

[22] Filed: Feb. 6, 1996

[51] Int. Cl.$^7$ .................................................. C08F 20/00
[52] U.S. Cl. .......................... 525/438; 525/533; 525/934; 528/112; 528/297
[58] Field of Search ..................... 525/438, 533, 525/934; 528/112, 297

[56] References Cited

U.S. PATENT DOCUMENTS

| | | | |
|---|---|---|---|
| 2,794,030 | 5/1957 | Phillips et al. | 260/348 |
| 2,907,735 | 10/1959 | Greenlee | 260/22 |
| 2,928,805 | 3/1960 | Reiff | 260/45.4 |
| 2,963,490 | 12/1960 | Rowland et al. | 260/348 |
| 2,967,840 | 1/1961 | Phillips et al. | 260/22 |
| 3,284,375 | 11/1966 | Shokal | 260/2 |
| 3,493,631 | 2/1970 | Christenson et al. | 260/834 |
| 3,836,606 | 9/1974 | Baum | 260/861 |
| 4,356,285 | 10/1982 | Kumagai | 525/438 |
| 5,097,006 | 3/1992 | Kapilow et al. | 528/272 |
| 5,244,985 | 9/1993 | Nobe et al. | 525/437 |
| 5,272,187 | 12/1993 | Gross et al. | 525/438 |
| 5,623,003 | 4/1997 | Tanaka | 523/428 |

FOREIGN PATENT DOCUMENTS

| | | |
|---|---|---|
| 0319203 | 6/1989 | European Pat. Off. . |
| 2455898 | 10/1975 | Germany . |
| 57-014613 | 1/1982 | Japan . |
| 6-32872 | 2/1994 | Japan . |
| 06032872 | 8/1994 | Japan . |
| 07062064 | 3/1995 | Japan . |
| 802127 | 4/1956 | United Kingdom . |
| 811126 | 4/1956 | United Kingdom . |
| 906011 | 9/1962 | United Kingdom . |

OTHER PUBLICATIONS

"Epoxidation of Polyesters of Tetrahydrophthalic Acid and Unsaturated Alkyd Resins," by John W. Pearce and John Kawa, *The Journal of the American Oil Chemists' Society*, vol. 34, Feb. 1957, pp. 57–61.

"Film Curing by Simultaneous Esterification and Olefin Polymerization," by Sylvan O. Greenlee, J.W. Pearce, and John Kawa, *Industrial and Engineering Chemistry*, vol. 49, No. 7, Jul. 1957, pp. 1085–1088.

"Synthesis of Unsaturated Polyester Resins With the Use of Anhydrides of Cyclic Non–Aromatic Dicarboxylic Acids," by Z. Piotrowska and J. Kielkiewicz, *International Polymer Science and Technology*, vol. 23, No. 2, 1996, pp. T/98–T/100.

*Chemical Abstract*, vol. 96, No. 26, Jun. 28, 1982, Columbus, Ohio, p. 102.

International Search Report, date of mailing Jan. 16, 1998.

Smarsh, "Powder Coating:Why–How–When" Journal of Paint technology, Feb. 1972.

Encyclopedia of Science and Technology, vol. 6, pp. 350–351, 1986.

*Primary Examiner*—Robert Dawson
*Assistant Examiner*—D. Aylward

[57] ABSTRACT

A curable epoxidized polyester-based composition useful for powder coatings application is provided by epoxidizing a polyester having a melting point of at least 90° C. and a viscosity of at most 50 Poise@ 200° C., where such polyester is a polyester prepared by reacting (I) a tetrahydrophthalic acid or anhydride, (ii) at least one cycloaliphatic polyol, (iii) at least one saturated polycarboxylic acid, and (iv) optionally at least one other alcohol under conditions effective to obtain a solid polyester having a melting point of at least 90° C. Curable coating powder is obtained containing the epoxidized polyester and a solid carboxylic acid curing agent having an acid equivalent weight within the range of from about 100 to about 1500.

23 Claims, No Drawings

EPOXIDIZED POLYESTER-BASED POWDER COATING COMPOSITIONS

FIELD OF THE INVENTION

This invention relates to powder coating compositions. In one aspect, the invention relates to epoxidized, solid resin compositions useful for powder coatings.

BACKGROUND OF THE INVENTION

Thermosetting powder coatings with some degree of exterior durability can be prepared from polyester and acrylic-based resins combined with suitable coreactants. Currently available, exterior grade epoxy group-containing materials are exemplified by triglycidyl isocyanurate (TGIC) and glycidyl methacrylate (GMA) containing acrylic resins. TGIC-based powder coatings, however, do not have sufficient weatherability, as evidenced by loss of gloss and discoloration. Although acrylic materials generally have superior weatherability, they are known to have poor physical properties( eg., flexibility and impact resistance) and create film defects in other powder coating materials when present as a contaminant. While other solid epoxy resins such as EPON® Resins 2002, 2003 and 2004 are available, they do not provide for exterior durability, because they consist of aromatic subunits. Thus, there is a need for improved low aromatic or non-aromatic, solid epoxy resins that can react with low aromatic or non-aromatic acrylic resins and polyesters to produce weatherable powder coatings.

SUMMARY OF THE INVENTION

According to the invention, a curable coating powder composition is provided comprising:
(a) a solid epoxidized polyester prepared by epoxidizing a polyester having a melting point of at least about 90° C., wherein said polyester is a polyester prepared by reacting a mixture comprising
   (i) a tetrahydrophthalic acid or anhydride,
   (ii) at least one cycloaliphatic polyol,
   (iii) optionally at least one saturated polycarboxylic acid, and
   (iv) optionally at least one other alcohol,
   in a mole ratio of (i):(ii):(iii):(iv) such that acid to hydroxyl equivalent ratio is from about 0.8 to 1 to about 0.96 to 1, and an equivalent ratio of (i) to (iii) from about 100:0 to about 1:4 and an equivalent ratio of (ii) to (iv) of about 100:0 to about 4:1; and
(b) a solid carboxylic acid component having an acid equivalent weight within the range of from about 100 to about 1500.
Such coating powder provides a cured powder coating having good resistance to hydrolysis and ultraviolet light.

DETAILED DESCRIPTION OF THE INVENTION

Solid Epoxidized Polyester

The epoxidized polyester must be friable and non-sintering to be useful for powder coatings applications. The polyester sinters if it agglomerates (sticks together) at room temperature within one week and cannot be readily redispersed. The solid epoxidized polyester preferably has a melting point of at least 100° C. to obtain good performance.

It has been found that solid epoxidized polyesters useful for powder coatings applications can be prepared by epoxidizing a polyester having a Tg of preferably greater than about 50° C., a melting point of at least about 90° C. and a viscosity (ICI Cone & Plate viscosity) of at most 50 Poise at 200° C. Such polyesters can be prepared by reacting (i) a tetrahydrophthalic acid or anhydride, (ii) at least one cycloaliphatic polyol, (iii) optionally at least one saturated polycarboxylic acid, and (iv) optionally at least one other alcohol, in a mole ratio of (i):(ii):(iii):(iv) such that total acid to hydroxyl equivalent ratio is from about 0.8 to 1 to about 0.96 to 1, preferably 0.85 to 1 to about 0.95 to 1, and an equivalent ratio of (i) to (iii) from about 100:0, preferably from about 4:1, to about 1:4, preferably from about 2:1 to about 1:2 and an equivalent ratio of (ii) to (iv) of about 100:0 to about 4:1, preferably to about 12.5:1. In a preferred embodiment, it is desirable to have from about 2:1 to about 1:2 equivalent ratio, of component (I) to (iii), to obtain a good weatherable formulation. The reaction is typically carried out by heating the mixture at a temperature within the range of from about 150° C., preferably from about 170° C., to about 240° C., preferably to about 230° C. until the acid value of the reaction mixture reaches about 5 or less, preferably less than about 2. Preferably the water and/or other condensation products formed during the reaction are continuously removed. The reaction mixture can also contain inert organic solvents, for example, ketones such as 2-butanone, 4-methyl-2-pentanone and hydrocarbons such as xylene and toluene. A catalyst can be added to facilitate the completion of the reaction. Such catalysts include for example, those prepared from titanium, zirconium, tin and antimony, as well as other conventional catalysts used in polyesterification reactions. The solid polyester resins produced can be recovered by conventional methods.

The alcohol is preferably a polyhydric alcohol having 5–50 carbon atoms and two to four hydroxyl groups per molecule. Small amounts, at most 15 equivalent percent, preferably less than 10 equivalent percent, if any, of the total hydroxyl content, of polyhydric alcohols having 4 carbon atoms or less or monohydric alcohols may also be present in the reaction mixture.

Examples of the tetrahydrophthalic acids or anhydrides useful for preparing the solid polyester include, cyclohex-4-ene-1,2-dicarboxylic anhydride, 3-methylcyclohex-4-ene-1,2-dicarboxylic anhydride, 4-methylcyclohex-4-ene-1,2-dicarboxylic anhydride, cyclohex-4-ene-1,2-dicarboxylic acid, 3-methylcyclohex-4-ene-1,2-dicarboxylic acid, 4-methylcyclohex-4-ene-1,2-dicarboxylic acid, and mixtures thereof. Examples of the cycloaliphatic polyols useful for preparing the solid polyester include cyclohexanedimethanol and hydrogenated bisphenol A, and mixtures thereof. Examples of the saturated polycarboxylic acids useful for preparing the solid polyester include hexahydrophthalic anhydride, hexahydrophthalic acid, 1,4-cyclohexanedicarboxylic acid, the dimethylester of cyclohexanedicarboxylic acid, and mixtures thereof. Examples of the polyhydric alcohols, component (iv), include trimethylolpropane, neopentyl glycol, trimethylolethane, pentaerythritol, and mixtures thereof. Examples of the polyhydric alcohol having 4 carbon atoms or less include ethylene glycol, 1,3-propanediol, 1,4-butanediol. Examples of the monohydric alcohols include butanol, 2-ethyl-1-hexanol and cyclohexanol.

The solid polyesters can be epoxidized by any conventional epoxidation method such as disclosed in U.S. Pat. Nos. 5,244,985, 3,493,631 and 2,928,805 which are herein incorporated by reference. For example, the solid polyesters can be epoxidized by treatment with acid solutions such as peracetic acid, performic acid, generated separately or in-situ from formic acid and hydrogen peroxide in the presence of a strong acid or an acidic resin, or mixtures of molybdic acid and hydrogen peroxide, in the presence of a sufficient quantity of a base such as sodium carbonate, sodium bicarbonate or disodium hydrogen phosphate to neutralize the contained strong acid, at a temperature within the range of from about 0° C., preferably from about 20° C., to about 70° C., preferably to about 40° C. The resulting epoxidized solid polyesters preferably have WPE (weight per equivalent of epoxy functionality) values within the range of about 350 to about 1500. The solid, friable epoxidized polyesters are recovered by conventional methods.

Solid Carboxylic Acid

The carboxylic acid curing agent must also be solid and friable to be useful for powder coatings applications. It has been found that such a carboxylic acid component useful as a curing agent for powder coatings application must have an acid equivalent weight within the range of from about 100, preferably from about 110, to about 1500, preferably to about 900. Such a carboxylic acid preferably has 10 to 100 carbon atoms and about two to about four carboxyl groups, more preferably about two carboxyl groups per molecule on average, provided it has an acid equivalent weight within the range of from about 100 to about 1500.

Examples of the polycarboxylic acids include, straight or branched chain solid, preferably crystalline, alkanoic acids such as dodecanedioic acid and sebacic acid. Another preferable polycarboxylic acid can be prepared by reacting a mixture, including at least one cycloaliphaticdicarboxylic acid or anhydride and at least one polyhydric alcohol having 5–50 carbon atoms in an acid to hydroxyl equivalent ratio of less than 2:1, preferably 1.2:1, to about 2:1, preferably to about 1.4:1. A mixture of more than one polyhydric alcohol is preferred to obtain optimum performance and ease of handling. Examples of the cycloaliphatic dicarboxylic acid or anhydride and polyhydric alcohols are listed above.

Coating Powder

A curable coating powder composition comprises (a) the solid epoxidized polyester and (b) the acid functional component. The amount of (a) to (b) will generally be within plus or minus about 35 percent of the stoichiometric amount. The ratio may be adjusted to compensate for the type of catalyst, cure conditions, and desired coating properties. Ratios outside the range can lead to low molecular weight, poorly crosslinked products with less than optimum properties. Conventional powder coating additives such as flow control agents, anti-popping agents, powder flow materials, fillers and pigments may also be included. The curable coating powder composition may further include a small percentage of catalysts such as phosphonium salts(eg., ethyltriphenylphosphonium iodide), imidazoles and tin salts (eg., dibutyltin oxide) in order to increase the crosslinking rate of the coating composition depending on the desired application.

The thermosetting coating powder compositions can be prepared by the various methods known to the powder coating industry: dry blending, melt compounding by two roll mill or extruder and spray drying. Typically the process used is the melt compounding process: dry blending the ingredients in a planetary mixer and then melt blending the admixture in an extruder at a temperature within the range of about 80° C. 130° C. The extrudate is then cooled and pulverized into a particulate blend.

The thermosetting coating powder composition can then be applied directly to a substrate of, e.g., a metal such as steel or aluminum. Non-metallic substrates such as plastics and composites can also be used. Application can be by electrostatic spraying or by use of a fluidized bed. Electrostatic spraying is the preferred method. The coating powder can be applied in a single sweep or in several passes to provide a film thickness after cure of about 2.0 to about 15.0 mils.

The substrate can optionally be preheated prior to application of a coating powder composition to promote uniform and thicker powder deposition. After application of the coating powder, the powder-coated substrate is baked, typically at about 120° C., preferably from about 150° C., to about 205° C. for a time sufficient to cure the powder coating composition, typically from about 1 minute to about 60 minutes, preferably from about 10 minutes to about 30 minutes.

The coating powder compositions can be applied directly upon bare metal or plastics or composites (e.g., upon untreated, unprimed steel) or upon pretreated surfaces (e.g., phosphatized, unprimed steel). The powder coating compositions can also be applied upon phosphatized steel having a thin (0.8 mils to 2 mils) layer of an electrodeposited primer, cured or uncured before the application of the coating powder composition or over a chip-resistant coating layer as a top coating layer. Examples of a chip-resistant layer is described, for example in U.S. Pat. Nos. 5,115,029 and 5,264,503. The electrodeposited primer coating upon the metal substrate can be, for example, a cathodic electrodeposition primer composition. In one aspect of the present invention, it is contemplated that the coating powder composition can be applied directly upon an uncured electrodeposited primer coating and the coating powder can be co-cured by heating at temperatures between about 150° C. to about 180° C. from about 10 minutes to about 30 minutes.

The powder coating compositions of this invention exhibit good UV resistance, which can be seen by good retention of gloss at 60°, good chemical resistance and have good flow under cure conditions useful for exterior durable powder coatings for automobiles, for general metal surfaces such as wheel covers and architectural components such as window frames. The powder coating compositions of the invention are desirable over conventional liquid systems because they have essentially no volatile organic content.

Illustrative Embodiment

The following illustrative embodiments describe the novel epoxy resin composition of the invention and are provided for illustrative purposes and are not meant as limiting the invention.

Tetrahydrophthalic anhydride was obtained from Janssen Chemical. Hexahydrophthalic anhydride and hydrogenated bisphenol A were obtained from Milliken Chemical. 1,4-Cyclohexanedimethanol was obtained from either Aldrich Chemical Co. or from Eastman Chemical Co. 1,4-Cyclohexane dicarboxylic acid was provided by Eastman Chemical Co. Trimethylolpropane mentioned in the examples below was obtained from Aldrich Chemical Co. Tin catalyst (Fascat 4100) was obtained from Elf Atochem. Equilibrium peracetic acid (35%) was purchased from Aldrich Chemical Co.

EXAMPLES 1–8

Preparation of Solid Hydroxyl-Functional Polyester

Solid polyesters containing multiple sites of olefinic unsaturation were prepared by reacting varying amounts of the reactants listed in Table 1, (CHDA= cyclohexanedicarboxylic acid; THPA=tetrahydrophthalic anhydride; HHPA=hexahydrophthalic anhydride; CHDM=1,4-cyclohexanedimethanol; HBPA=hydrogenated bisphenol A; TMP=trimethylolpropane). Two procedures were used to add the reagents.

In one procedure, the acid-functional reactants, HBPA and toluene were placed in a 5.0 liter flask, equipped with a Dean-Stark trap and condenser, thermocouple and overhead stirrer assembly. The flask and its contents were briefly purged with nitrogen; then, a positive pressure of nitrogen was maintained until initiation of sparge. The components were heated to reflux and held for one hour. Afterwards, a solution of 2-butanone (800 grams) and the remaining hydroxyl components were added, allowing for continuous removal of solvent. In the alternative procedure, cyclohexanedimethanol was added along with the other reactants prior to heating.

The reaction mixture was warmed slowly to 200° C., removing solvent and byproduct water as required. The reaction mixture was maintained at reflux to facilitate removal of water until the evolution rate of water diminished. Fascat 4100 (a butylated tin oxide) was added all at once, either at the beginning of the reaction or after the initial evolution of water of condensation slowed. After maintaining a temperature of 200° C. for 1–2 hours, the reaction mixture was further warmed to 220° C. and was sparged with nitrogen. This was maintained until the acid number of the resin was less than 1. Acid number was measured by titration of a 50:50 (w/w) toluene/isopropanol solution of resin with 0.1N ethanolic potassium hydroxide. The polyester resin produced was isolated by transferring the contents of the flask to aluminum pans.

Properties of the resultant solid polyesters are listed in Table 2. Viscosity was measured at 200° C., unless noted otherwise, by ICI Cone & Plate. Mettler melting point (M.P. in degree centigrade) and final acid value are listed.

TABLE 1[1]

| Example | CHDA | THPA | HHPA | CHDM | HBPA | TMP | Acid/OH[2] |
|---|---|---|---|---|---|---|---|
| 1 | | 10.1 | 8.6 | 16.7 | 3.3 | | 0.935/1 |
| 2 | | 1.19 | 1.81 | 3.02 | | 0.24 | 0.92/1 |
| 3 | | 1.9 | | 1.66 | 0.34 | | 0.95/1 |
| 4 | | 2.4 | | | | 4.48 | 0.54/1 |
| 5 | 0.86 | 1.01 | | 1.67 | 0.33 | | .935/1 |
| 6 | 5.16 | 6.06 | | 10.4 | 2.06 | | 0.9/1 |
| 7 | | 9.35 | | 8.35 | 1.65 | | 0.935/1 |
| 8 | | 10.1 | 8.6 | 16.7 | 3.35 | 0.3 | 0.92/1 |

[1]Values represent equivalents employed:

| MOLECULE | EQUIV.WT. |
|---|---|
| CHDA | 86 |
| THPA | 76 |
| HHPA | 77 |
| CHDM. | 72 |
| HBPA | 120 |
| TMP | 44.7 |

[2]Ratio based on equivalenls employed

TABLE 2

| Example | Acid No. | M.P. (° C.) | Melt Viscosity (Poise/° C.) | Degree of Olefin Functionality[1] | Mn[2] |
|---|---|---|---|---|---|
| 1 | 0.88 | 101.7 | 21/200 80/175 | 7.7 | 4400 |
| 2 | 0.43 | 107.5 | 75/175 | 6.6 | 4768 |

TABLE 2-continued

| Example | Acid No. | M.P. (° C.) | Melt Viscosity (Poise/° C.) | Degree of Olefin Functionality[1] | Mn[2] |
|---|---|---|---|---|---|
| 3 | 1.9 | 138.1 | >250/200 | 19 | 5752 |
| 4 | 5.1 | 66.6 | 13/150 | 4.1 | 1231 |
| 5 | 1.5 | 108 | 52/175 | 7.8 | 4400 |
| 6 | 0.5 | 90.8 | 22/175 | 4.9 | 2827 |
| 7 | 0.9 | 103 | 14/200 47/175 | 14.4 | 4386 |
| 8 | 0.9 | 104.3 | 29/175 | 7.5 | 4246 |

[1]Degree of functionality is the theoretical value
[2]Mn is the theoretical number average molecular weight As can be seen from the Tables above, the polyesters of Examples 1–2 and 5–8 have melting points of above 90° C. and viscosity measurements of less than 50 Poise at 200° C. Example 4 is provided as a comparative example with the melting point too low. Example 3 is provided as a comparative example with the viscosity too high. The acid to OH ratio of Example 7 is such as to obtain a low viscosity value suitable for processing in powder coating applications.

EXAMPLES 9–13

Preparation of Solid Epoxidized Polyester

The polyesters obtained above were dissolved in toluene or methylene chloride (25/75–40/60 w/w) and reacted with equilibrium 35% peracetic acid at 25 to 40° C. for two to three hours. The reaction mixture was treated with sufficient sodium carbonate to neutralize the sulfuric acid contained in the peracetic acid. Subsequent to reaction, the epoxidized polyester was isolated in one of two ways. In one method (method A), the reaction mixture was condensed under reduced pressure to remove water, unreacted hydrogen peroxide, peracetic acid and acetic acid as well as some solvent. The residue was diluted to 25% solids with toluene or methylene chloride and either filtered or washed 4–5 times with water to remove solid impurities. The resin solution was then condensed by distillation of volatiles under reduced pressure and at elevated temperature(200° C. max.). The residue was optionally sparged with nitrogen to remove the final traces of volatiles to render a product more acceptable as a coating powder vehicle.

In another method (method B), the reaction mixture after completion of the epoxidation reaction was diluted to 25% solids as above then filtered; afterwards, the mixture was washed 4–5 times with water and condensed by distillation and sparging as described above.

The WPE (weight per equivalent of epoxy functionality), Mettler melting point (M.P. in degree centigrade) and ICI Cone & Plate viscosity at 200° C. are listed below in Table 3. The WPE was determined by titration of a dichloromethane/acetic acid solution of resin and tetraethylammonium bromide with standardized 0.1N perchloric acid in acetic acid to a crystal violet endpoint.

TABLE 3

| Example | Polyester Prepared in Example | WPE | Melt Viscosity (Poise/° C.) | Mettler M.P. (° C.) |
|---|---|---|---|---|
| 9 | 2 | 852 | 142/175 | 107.7 |
| 10 | 5 | 783 | 69/175 | 107.7 |
| 11 | 6 | 721 | 68/175 | 105.3 |
| 12 | 7 | 490 | — | — |
| 13 | 8 | 682 | 36/175 | 112 |

EXAMPLES 14–17

Preparation of Acid Functional Component

Acid functional components (polyester curing agents) were prepared by reacting varying amounts of the reagents listed in Table 4 in equivalents, (CHDA=cyclohexane dicarboxylic acid; HHPA=hexahydrophthalic anhydride; CHDM=1,4-cyclohexanedimethanol; TMP=trimethylolpropane) in a manner similar to that used to prepare the polyesters described above in Tables 1 and 2. All reagents were placed in a four neck flask fitted with an overhead stirring assembly, a thermocouple, a Dean-Stark trap and condenser, and a source of nitrogen. Xylene was optionally added to the reactants to serve as a carrier for the water to be formed. After briefly purging the flask and its contents with nitrogen, a positive pressure of nitrogen was applied and the mixture was heated to reflux, if xylene was employed, or to 150° C. For Examples 15–17, 0.1–0.2 wt. % Fascat 4100 catalyst was added. After one hour at this temperature, the mixture was warmed to 175° C. and maintained at that temperature until approximately 75% of the water had evolved. After this time, the mixture was warmed to 200° C. After water evolution again slowed, the mixture was sparged with nitrogen until the theoretical acid number was attained or exceeded. The total Acid/OH ratio and melting point of each product is listed in Table 4.

TABLE 4[1]

| Example | CHDA | HHPA | CHDM | TMP | Acid/Hydroxyl eq. Ratio | Acid Eq. Wt. | Melt Pt. ° C. | Melt Viscosity (Poise/° C.) |
|---|---|---|---|---|---|---|---|---|
| 14 | | 6 | | 3 | 2.0 | 197.6 | 94.3 | 25/150 |
| 15 | 1.85 | | 1.6 | | 1.16 | 1064 | 93.5 | 115/150 |
| 16 | 2.0 | | 1.48 | 0.28 | 1.15 | 1017 | 106.8 | 165/175 |
| 17 | 2.0 | | 1.03 | 0.48 | 1.32 | 503 | 99.5 | 50/175 |

[1]Values represent equivalents employed.

EXAMPLES 18 AND 19

Preparation of powder coating and properties of the cured products.

| | Example 18 | Example 19 |
|---|---|---|
| Example 13, Oxirane Component | 395 | — |
| Example 17, Curing Coreactant | 296 | — |
| Polyester Resin[A], DSM P-3900 | — | 596 |
| TGIC[B] | — | 45 |
| Modaflow Powder III[C] | 7 | 6 |
| Benzoin | — | 3 |
| Ethyltriphenylphosphonium Iodide | 2 | |
| Titanium Dioxide (Exterior Grade) | 300 | 350 |
| TOTAL | 1000 | 1000 |

[A]Acid functional polyester resin from DSM. Acid Value = 32–38.
[B]Araldite PT 810 from Ciba-Geigy.
[C]Acrylate copolymer from Monsanto.

Manufacturing Process

The above composition were processed using a typical coating powder manufacturing process: Intensive premix, high shear melt compounding (extrusion), grinding and sieving through a 200 mesh screen.

Powder Coating Performance
Coatings were electrostatically sprayed to about two mils cured film thickness on "type S" Q-Panels and cured as listed

| | Example 18 | Example 19 |
|---|---|---|
| Cure Cycle | 20 min. 350° F. | 10 min. 400° F. |
| GEL TIME[A], Sec. @ 175° C. | 97 | — |
| Sec. @ 200° C. | 45 | 220 |
| GARDNER IMPACT[B], Inch Pounds | | |
| DIRECT | Pass 50 | — |
| REVERSE | Fail 10 | Fail 10 |
| FLEXIBILITY[C], Conical Mandrel | Pass 1/8 inch | — |
| PENCIL HARDNESS[D] (Gouge Hardness) | 2 H–4 H | — |
| MEK RESISTANCE[E], Double Rubs | Pass 100 | Pass 50 |
| GLOSS[F], Percent @ 20 Degrees | 73 | 61 |
| 60 Degrees | 91 | 91 |
| COLOR[G], 20 Minutes in 350° F. L | 94.6 | 91.5 |
| a | −0.92 | −1.03 |
| b | −0.24 | 0.23 |
| SMOOTHNESS[H], PCI Standards | 6 | — |
| WEATHERING TESTS[I] | | |
| QUV-B 60° gloss retention | 97%, 1000 Hr. | 30%, 200 Hr. |

-continued

Powder Coating Performance
Coatings were electrostatically sprayed to about two mils cured film thickness on "type S" Q-Panels and cured as listed

| | Example 18 | Example 19 |
|---|---|---|
| Yellowing, Δb | 0.15, 1000 Hr. | 3.0, 200 Hr. |
| EMMAQUA 60° gloss retention | 65–85%, 5 Yr. | 50%, 3 Yr. |
| Yellowing | None | Severe |

[A]Powder Coating Institute (PCI) Test Procedure # 6.
[B]ASTM D2794.
[C]ASTM D522
[D]ASTM D3363
[E]PCI #8.
[F]ASTM D523
[G]ASTM D2244
[H]PCI #20
[I]ASTM D4141

As can be seen from the Table above, the powder coating of the invention, Example 18, has superior weatherability and other performance properties at least equivalent to a typical TGIC-polyester powder, Example 19. 60° gloss retention was 97% after 1000 hours for the invention versus 30% after 200 hours for the TGIC-polyester powder.

We claim:
1. A curable coating powder composition comprising:
   (a) a solid epoxidized polyester prepared by epoxidizing a polyester having a melting point of at least about 90°

C. and a viscosity of at most 50 Poise at 200° C., wherein said polyester is a polyester prepared by reacting, in a reaction mixture comprising
(i) a tetrahydrophthalic acid or anhydride,
(ii) at least one cycloaliphatic polyol,
(iii) optionally at least one saturated polycarboxylic acid, and
(iv) optionally at least one polyhydric alcohol having 5–50 carbon atoms,
in a mole ratio of (i):(ii):(iii):(iv) such that acid to hydroxyl equivalent ratio is from about 0.8 to 1 to about 0.96 to 1, and an equivalent ratio of (i) to (iii) is from about 100:1 to about 1:4 and an equivalent ratio of (ii) to (iv) of about 100:0 to about 4:1 until the acid value of the reaction mixture is about 5 or less; and
(b) a solid carboxylic acid component having an acid equivalent weight within the range of from about 100 to about 1500.

2. The curable coating powder composition of claim 1 wherein the tetrahydrophthalic acid or anhydride is selected from the group consisting of cyclohex-4-ene-1,2-dicarboxylic anhydride, 3-methylcyclohex-4-ene-1,2-dicarboxylic anhydride, 4-methylcyclohex-4-ene-1,2-dicarboxylic anhydride, cyclohex-4-ene-1,2-dicarboxylic acid, 3-methylcyclohex-4-ene-1,2-dicarboxylic acid, 4-methylcyclohex4-ene-1,2-dicarboxylic acid, and mixtures thereof.

3. The curable coating powder composition of claim 2 wherein component (ii) is selected from the group consisting of cyclohexanedimethanol and hydrogenated bisphenol A, and mixtures thereof.

4. The curable coating powder composition of claim 3 wherein component (iii) is selected from the group consisting of hexahydrophthalic anhydride, hexahydrophthalic acid, 1,4-cyclohexanedicarboxylic acid, the dimethylester of cyclohexane dicarboxylic acid, and mixtures thereof.

5. The curable coating powder composition of claim 4 wherein component (iv) is selected from the group consisting of trimethylolpropane, neopentyl glycol, trimethylolethane, pentaerythritol, and mixtures thereof.

6. The curable coating powder composition of claim 4 wherein the carboxylic acid component (b) has 10 to 100 carbon atoms.

7. The curable coating powder composition of claim 6 wherein the carboxylic acid component (b) is prepared by reacting
(v) at least one cycloaliphatic dicarboxylic acid or anhydride, and
(vi) at least one polyhydric alcohol having 5–50 carbon atoms in a mole ratio of (v):(vi) of from about 1.2:1 to about 2:1.

8. The curable coating powder composition of claim 7 wherein component (v) is selected from the group consisting of hexahydrophthalic anhydride, hexahydrophthalic acid, 1,4-cyclohexane dicarboxylic acid, and mixtures thereof.

9. The curable coating powder composition of claim 8 wherein component (vi) is selected from the group consisting of cyclohexanedimethanol, hydrogenated bisphenol A, trimethylolpropane, trimethylolethane, pentaerythritol, and mixtures thereof.

10. The curable coating powder composition of claim 6 wherein component (ii) comprises hydrogenated bisphenol-A.

11. The curable coating powder composition of claim 6 wherein component (ii) comprises cyclohexanedimethanol.

12. The curable coating powder composition of claim 11 wherein acid to hydroxyl equivalent ratio of (i):(ii):(iii):(iv) is within the range of 0.90 to 1 to 0.96 to 1.

13. A cured powder coating composition of claim 1.
14. A cured powder coating composition of claim 3.
15. A cured powder coating composition of claim 6.
16. A cured powder coating composition of claim 10.
17. A cured powder coating composition of claim 11.

18. A process for preparing a solid epoxidized polyester having a melting point of at least 100° C. comprising:
(a) reacting
(i) a tetrahydrophthalic acid or anhydride,
(ii) at least one cycloaliphatic polyol,
(iii) optionally at least one saturated polycarboxylic acid, and
(iv) optionally at least one polyhydric alcohol having 5–50 carbon atoms,
in a mole ratio of (i):(ii):(iii):(iv) such that acid to hydroxyl equivalent ratio is from about 0.8 to 1 to about 0.96 to 1, and an equivalent ratio of (i) to (iii) from about 100:1 to about 1:4 and an equivalent ratio of (ii) to (iv) of about 100:0 to about 4:1 until the acid value of the reaction mixture is about 5 or less to produce a solid polyester having a melting point of at least 100° C.;
(b) epoxidizing said solid polyester thereby producing a solid epoxidized polyester; and
(c) recovering said epoxidized polyester.

19. The process of claim 18 wherein component (ii) is selected from the group consisting of cyclohexanedimethanol and hydrogenated bisphenol A, and mixtures thereof.

20. The process of claim 19 wherein component (iii) is selected from the group consisting of hexahydrophthalic anhydride, hexahydrophthalic acid, 1,4-cyclohexane dicarboxylic acid, the dimethylester of cyclohexane dicarboxylic acid, and mixtures thereof.

21. The process of claim 20 wherein component (iv) is selected from the group consisting of trimethylolpropane, neopentyl glycol, trimethylolethane, pentaerythritol, and mixtures thereof.

22. A curable coating powder composition comprising:
(a) a solid epoxidized polyester prepared by epoxidizing a polyester having a melting point of at least about 90° C. and a viscosity of at most 50 Poise @ 200° C., wherein said polyester is a polyester prepared by reacting, in a reaction mixture comprising
(i) a tetrahydrophthalic acid or anhydride,
(ii) cyclohexanedimethanol, hydrogenated bisphenol A, or a mixture thereof, and
(iii) hexahydrophthalic anhydride, or hexahydrophthalic acid, and
(iv) optionally at least one polyhydric alcohol selected from the group consisting of trimethylolpropane, neopentyl glycol, trimethylolethane, and pentaerythritol,
in a mole ratio of (i):(ii):(iii):(iv) such that acid to hydroxyl equivalent ratio is from about 0.8 to 1 to about 0.96 to 1, and an equivalent ratio of (i) to (iii) from about 1:4 to about 4:1 and an equivalent ratio of (ii) to (iv) of about 100:0 to about 4:1; and
(b) a solid carboxylic acid component having an acid equivalent weight within the range of from about 110 to about 900.

23. A cured composition of claim 22.

* * * * *